United States Patent [19]
Watts, Jr.

[11] Patent Number: 5,453,931
[45] Date of Patent: Sep. 26, 1995

[54] NAVIGATING ROBOT WITH REFERENCE LINE PLOTTER

[76] Inventor: James R. Watts, Jr., 1253 Columbia Rd., Woodbridge, Va. 22191

[21] Appl. No.: 328,357

[22] Filed: Oct. 25, 1994

[51] Int. Cl.$^6$ .............................. G06F 15/00; B62D 1/22
[52] U.S. Cl. .................. 364/424.02; 180/168; 180/8.5; 395/80
[58] Field of Search ................. 364/424.02, 424.01, 364/551.01, 551.02, 559, 560, 561; 318/580, 587; 180/167, 168, 169, 8.1, 8.2, 7.3, 8.5, 8.6; 395/80, 85, 86, 88

[56] References Cited

U.S. PATENT DOCUMENTS

| | | | |
|---|---|---|---|
| 4,119,900 | 10/1978 | Kremnitz | 318/587 |
| 4,202,423 | 5/1980 | Soto | 364/424.01 |
| 4,241,803 | 12/1980 | Lauber | 180/8.1 |
| 4,446,470 | 5/1984 | Sugiyama et al. | 347/2 |
| 4,665,600 | 5/1987 | Faurie et al. | 29/33 K |
| 4,796,198 | 1/1989 | Boultinghouse et al. | 364/424.02 |
| 4,875,172 | 10/1989 | Kanayama | 364/424.01 |
| 4,938,305 | 7/1990 | Park | 180/8.1 |
| 5,031,109 | 7/1991 | Gloton | 364/478 |
| 5,032,775 | 7/1991 | Mizuno et al. | 364/424.02 |
| 5,073,749 | 12/1991 | Kanayama | 318/587 |
| 5,086,535 | 2/1992 | Grossmeyer et al. | 15/319 |
| 5,204,814 | 4/1993 | Noonan et al. | 364/424.02 |
| 5,307,272 | 4/1994 | Butler et al. | 364/424.02 |
| 5,316,100 | 5/1994 | Juan | 180/167 |

OTHER PUBLICATIONS

An article entitled "Encoders and Displays" of New England Affiliated technologies, p. G-2.
Parker, "Incremental Encoders" Compumotor Digiplan 1993–1994, pp. P7–P8.

Primary Examiner—Kevin J. Teska
Assistant Examiner—Tan Q. Nguyen
Attorney, Agent, or Firm—Clyde T. Coughenour

[57] ABSTRACT

A mobile robot for and a method of producing accurate physical lay-out and reference lines or performing work on a plane surface through cartesian coordinates or angle and distance systems is provided. The mobile robot has an on-board computer, a navigation system, and an emissions system. The robot is provided with a drive, for receipt of a floppy, or an internal drive, that can be programmed by an interested party directly or from a remote location by a plug-in. The program is loaded with locations that require treatment, work or equipment positioning. The robot locates and treats the coordinates with emission means, such as an ink jet type marking system, for workmen or for directly performing work at the coordinates.

24 Claims, 3 Drawing Sheets

NAVIGATING ROBOT WITH REFERENCE LINE PLOTTER

BACKGROUND OF THE INVENTION

1. Field of the Invention

The invention relates to a robot having a navigating system capable of executing cartesian coordinate functions and doing work or producing physical reference lines or singular reference points on a plane surface traversed, such as for construction for work and position location or other layout, on a selected surface area. The robot can also record the coordinates of a path traversed for later reference and, if desired, at the time or later, leave evidence of the path traversed.

2. Description of Related Art

In the construction and manufacturing industries, long-lasting reference lines are required to insure accurate placement of equipment, center lines, interior partitions, floor penetrations, exterior sheeting and accuracy of locations or relative positions where other action is required. The customary method used, after structural members and flooring are in place, is to recall the surveyors or field engineers to establish the reference lines, usually by the transit and tape method. Reference points outside the immediate work area are extended by a transit or theodolite into the work area to establish control points. The points are then connected. This is commonly done with a chalk line to provide control lines. Permanence is provided by applying a thin coating of spray paint over the chalk line. From the control line all other required locations are established by the same transit and tape method. This method is not only labor intensive and costly in both time and man-power but, more importantly, it is subject to many opportunities for human errors in reading and interpreting the blue print, performing repeated calculations, etc., that are necessary for consistent and accurate use of the survey equipment.

The use of mobile robots is well known and several robot navigation systems are known. These include buried guide means, central radio and optical systems and on-board computers. Navigating robots have been used primarily as carrier vehicles which begin at some point and find their way, through use of either sensors or a planned path of coordinates, along corridors and rooms to a desired location for delivery of objects. Examples are U.S. Pat. Nos. 4,119,900, issued 10 Oct. 1978 to Kremnitz; 5,032,775, issued 16 Jul. 1991 to Mizuno et al; 5,073,749, issued 17 Dec. 1991 to Kanayama; 5,086,535, issued 11 Feb. 1992 to Grossmeyer et al; and 5,031,109, issued 9 Jul. 1991 to Gloton. Robots have also been made with inclinometers and cut-off switches for various reasons.

These prior navigating robots have employed left and right wheel or track differential speeds and other wheel or track maneuver means to achieve the angular orientation necessary to travel from one point to another. The required accuracy of the surveyor is difficult to achieve by using these methods of turning. Prior surveying instruments achieve the required angular orientation accuracy by using a transit or theodolite. These systems, however, are confined to operating from stationary locations such as a tripod or permanent reference "monument" fitted to receive the instrument.

Marking systems have been placed on robot means. Examples are U.S. Pat. Nos. 4,665,600, issued 19 May 1987 to Faurie et al and 5,307,272, issued 26 Apr. 1994 to Butler et al. Multi-color ink jets are known. One example is U.S. Pat. No. 4,446,470, issued 1 May 1984 to Sugiyama et al.

SUMMARY OF THE INVENTION

The present invention overcomes prior difficulties by combining the high degree of accuracy of an instrument, such as the theodolite, with the navigating and computing ability of the mobile robot. An emitter, such as for air or light or liquid or powder, is affixed to an under carriage of a mobile robot to perform work or provide lines or marks on a floor or surface with a minimum of error and labor costs. When used as a marking system, it can be provided with several color inks, paints or dyes so that different concerns, e.g. walls, equipment, plumbing, etc., can each be marked with different colors to preclude confusion.

The robot is self propelled by battery power under the control of a computer and/or navigation system. The computer is programmed to store all desired coordinates which may be loaded, by designing points and arcs of interest to the engineer, contractor, artist, designer, grounds keeper, or other interested party, using a floppy disc, RS 232 port, or a keyboard. The robot executes the program to travel over the coordinates or locations where work is to be performed or markings are to be made on a surface. The work is performed or the markings are applied as the robot traverses the programmed path of travel or while it is stationary. The robot is provided with a theodolite, inclinometer, sensors, etc. for alignment, location and navigational purposes. To preclude errors associated with changes in direction, a "lift and turn" means is provided that raises the propulsion means above the surface being traversed for slippage free, accurate and sharp intersections when changing from an old direction of travel into a new direction of travel.

DESCRIPTION OF THE PREFERRED EMBODIMENT

Figure 1:
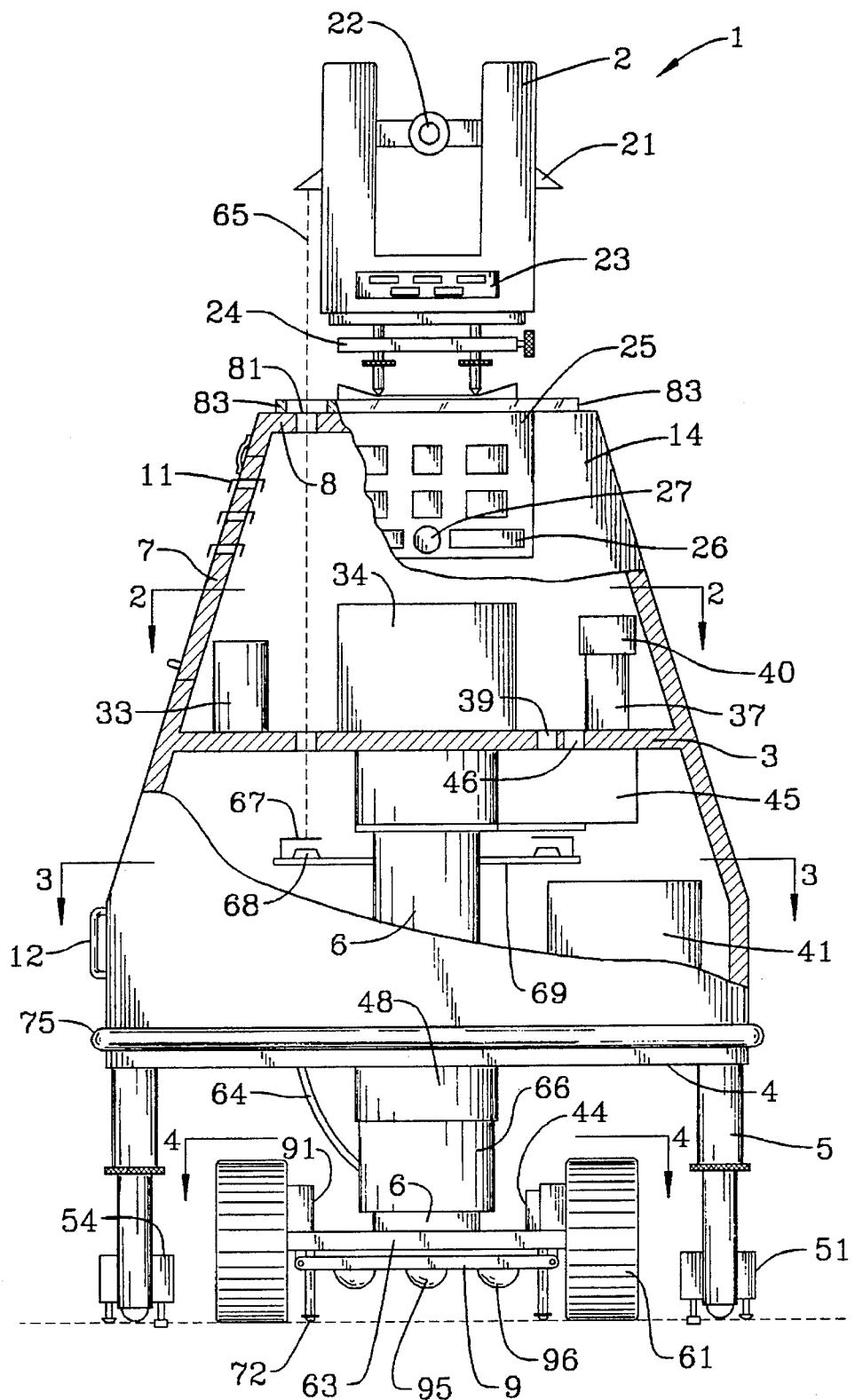
FIG. 1 is a front elevational view of the preferred embodiment with a section broken away to show internal components.
Figure 2:
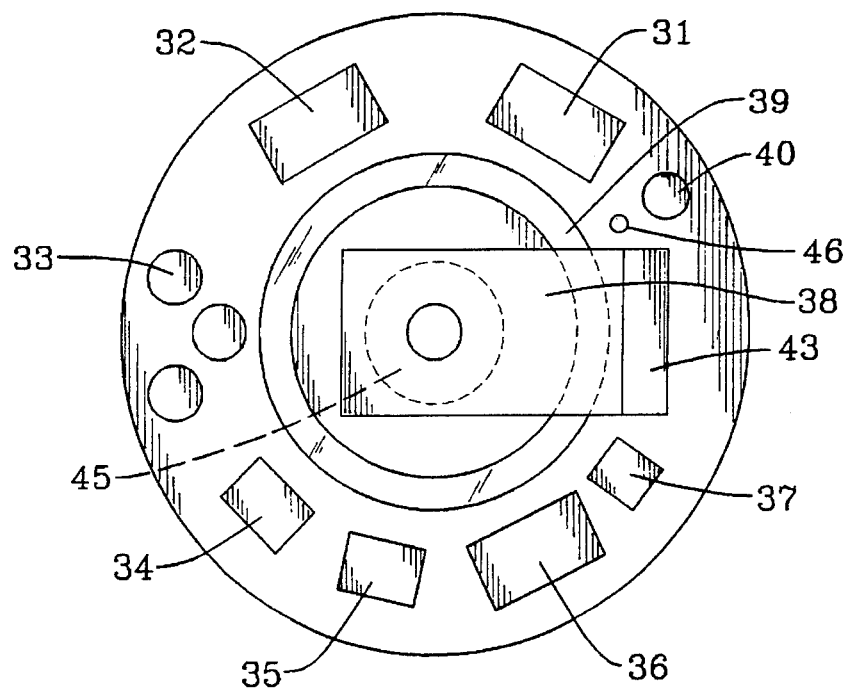
FIG. 2 is a top plan view of the mid-level support platform taken along section line 2—2 of FIG. 1.
Figure 3:
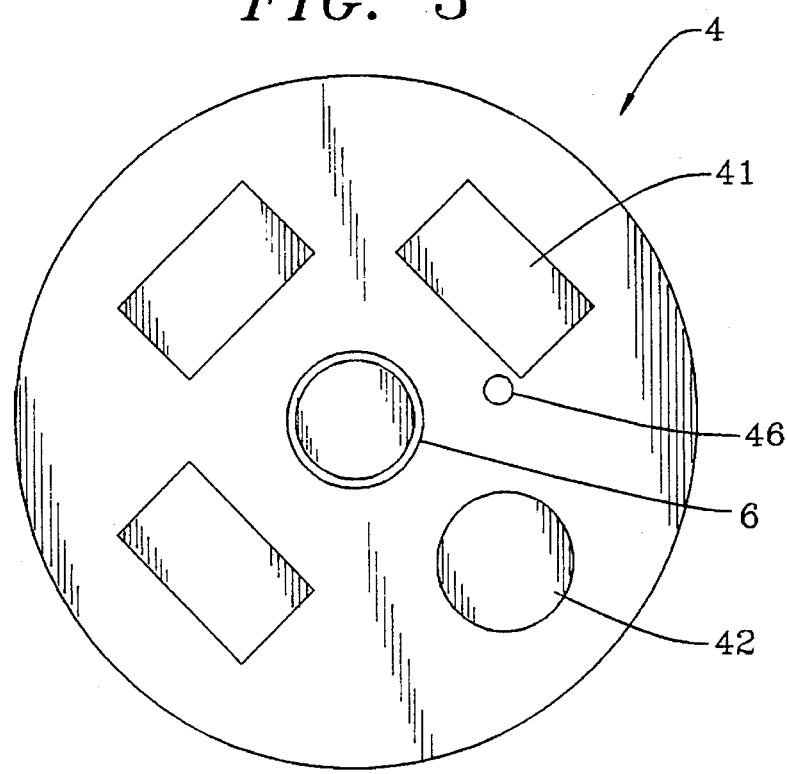
FIG. 3 is a top plan view of the lower support platform taken along section line 3—3 of FIG. 1.
Figure 4:
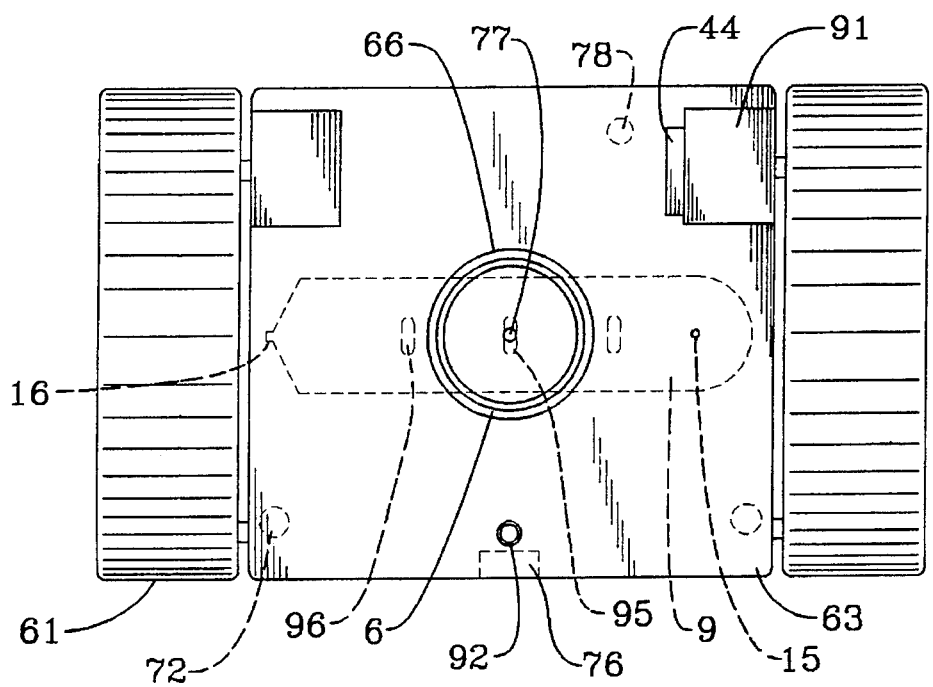
FIG. 4 is a top plan view of the robot undercarriage taken along section line 4—4 of FIG. 1.
Figure 5:
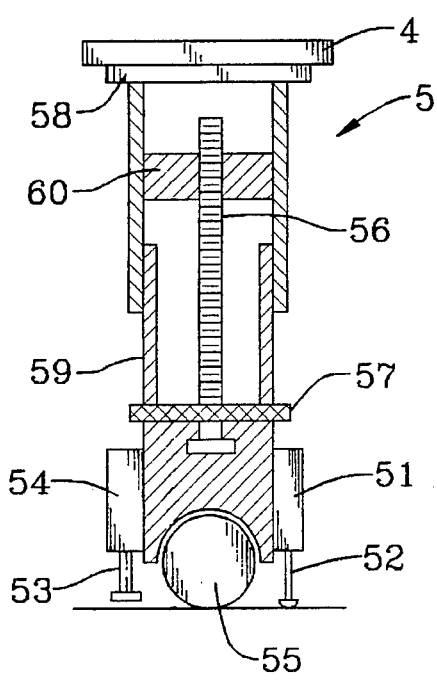
FIG. 5 is a side sectional elevation view of a support leg showing attached to it an edge detector and a lifting cylinder.
Figure 6:
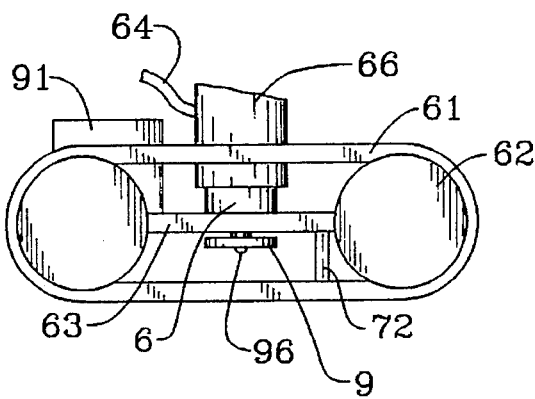
FIG. 6 is a side elevation view of the undercarriage, tracks and emissions system.

A preferred embodiment of the invention includes a robot having an instrument, such as theodolite or transit 22, centrally mounted atop a mobile stabilizing unit 14, housing the running gear, electric supply, emission means, controls, and associated devices. This mobile stabilizing unit is supported upon at least three legs 5 when resting on the work surface. The supporting legs are terminated by omni-directional bearing type casters 55, allowing unrestricted motion in any direction without rotating or restricting movement of the unit 14 itself. These supporting legs are equipped with a lifting and braking mechanism 54 which are engaged during angular orientation procedures. They prevent movement or drifting of the unit's position while making preparations for travel in a different direction. The theodolite 22 is mounted atop the stabilizing unit using the standard tribrach 24 lock-down. The tribrach, for reception of an instrument, is altered only in that its leveling screws are not adjustable, so that the instrument support will always be parallel to the horizontal surfaces of the stabilizing unit. The stabilizing unit allowing the instrument to be mounted correctly on the robot or removed and placed on a standard tribrach for more traditional use. One example of a tribrach that can be used is the WOA TRIBRACH leveling base with optical plummet, Lietz No. 7311-35, manufactured by Lietz and Sokkisha.

The stabilizing unit optionally includes three horizontal platforms or decks 3, 4, 8 held in position by a rigid framework. It is covered with a rigid or semi-rigid skin as a dust cover and ambient light barrier. The outer covering is equipped with louvers or ventilation ducts 11 to avoid excessive heat build-up. Ports or hatchways 7 are provided, allowing access to the interior components for service, replacement, and adjustments. The instrument also has a dust cover and ambient light barrier (not shown). This cover may be affixed to the instrument's uprights 2 and extend downward to the supporting platform 8, allowing free rotation of the instrument 22 relative to the platform. This dust-light barrier, affixed to the instrument, needs only to cover the uprights and lower portion of the instrument. It must not interfere with the orientation sensor 68 light path 65 and photo-reflector 21, and must leave the alidade and input buttons on the instrument indicator panel 23, if present, accessible for use. Ports are provided for access to controls such as instrument motion clamps, tangent screws, optical plumb, etc.

The three horizontal support platforms or decks 3,4,8 and the frame work should be of such rigidity as to resist flex or sag in excess of that which would impact the accuracy of the device. The total weight of the robot can be kept minimal, permitting manual transport. The upper-most platform 8, directly supporting the instrument, includes the permanently mounted tribrach 24, a transparent or light transmitting material circle 81 with a radius equal to the radius of the photo-electric reflectors 21 on the instrument uprights 2. A circular rim 83 can be provided on the upper surface of platform 8, to act as the lower portion of the instrument's dust-light barrier means, and a central opening is provided in the platform 8, for passage of the optical plumb fiber-optic cable that can be viewed on the tribrach 24.

The mid-level platform 3 can house the unit's computing devices affecting and controlling all systems. One arrangement consists of an on-board computer data storage unit 38 with a standard computer plug-in RS 232 port 27 for data input from an independent source. One three axis controller or three axis controller board 36 is provided. This programmable controller coordinates and distributes data from the computer to and from the drive components of the rotary positioning table 45, right track motor drive 35 and left track motor drive 34, in a feed forward feed-back method. Fans 40 can be provided for cooling the robot's internal components. The controller's and computer's input/output array, controls related systems and devices, i.e. unit brake and lift cylinders 54, emergency stop sensors 51, 75, ventilation fans 40, emitters 95, 96, and receive information from the inclinometer 44. The platform 3 includes a light transmitting circle 39 equal in radius to that 81 in the upper platform 8, so as to allow passage of signals from a photo-electric sensor 68 through both platforms 3,8 to the reflector mounted on the instrument uprights and for their return. The platforms also have ports 46 for optical plumb cable passage and for passing component wiring from below for computing unit 38, drivers 32, 34, 35, 37, controllers 36 and containers such as emitter supply silos 33. Care must be taken to arrange these components so as to not interfere or block photo-sensor light signal paths.

Attached securely to the underside of mid-level platform 3 is a rotary positioning table 45, mounted in an inverted position. The table center of rotation corresponds to the center of rotation of the instrument 22. This rotary table is capable of accurate angular positioning throughout a 360 degree range. It is equipped with a micro-stepping motor and rotary encoder as a feed-back device for the driver and controller. The rotary table is provided with an aperture of sufficient diameter for passage of component wiring, fiber-optic cable, and feed lines. Affixed to the face of this inverted rotary table is the hollow shaft 6 of sufficient diameter and wall thickness to prevent excessive distortion during rotation under load and passage of the necessary wires and lines. The rotatable table can be of the type manufactured by New England Affiliated Technologies, a Division of Instrument Industries, Inc., as models RT-4-SM or RT-6-SM or RT-8-SM. They include an index motor encoder and motor track angular positioning means referred to as "rotary table precision positioning components and systems".

The lower level support platform 4 includes a centrally located circular opening for housing a circular bearing, that acts as a guide and stabilizer for the lower portion of a hollow shaft 6. This shaft 6 will be perpendicular to all three platforms and its center of rotation will coincide with the center of rotation of the instrument 22. Care should be taken to arrange any items of significant weight so as to maintain a reasonable balance around the center of the platform. The lower level platform 4 houses a battery 41 array sufficient to power all systems and a hydraulic fluid supply means 42. The batteries can be used in series or parallel or individually. These batteries should be of the replaceable rechargeable type typically in the 12–60 volt range. Batteries for operating equipment with different voltage requirements can be provided or batteries with the same voltage and transformers or converters can be used if desired.

The shaft 6 extends vertically downward from the rotatable table and passes through the bearing housing 48 of the lower platform 4, and continues downward to be centrally affixed to a rotatable undercarriage 63 equipped with forward motion, left and right drive tracks 61 and/or wheels 62. This central shaft should have at its intersection with the guide bearing 48, either a raised lip or a groove to accept a snap-ring at both the upper and lower surface of the guide bearing to act as a stop. This structure lessens the dead load of the unit on the positioning table 45 in the running mode and during vertical pull during the lifting mode. The shaft 6 has affixed to it two retro-reflective photo-electric orientation sensors 68 with slit masks 67. These sensors 68 are shown located on the connecting shaft 6 between the lower 4 and mid-level 3 platforms. They could be supported by a means extending upwardly above the mid-platform if desired. The sensors are shown affixed to the connecting shaft by brackets 69 and are 180 degrees apart and extend radially outwardly on either side of the shaft 6 a distance equal to the radius of the center of the reflectors 21 affixed to the instrument uprights 2. These sensors 68 are affixed to the connecting shaft 6 so as to be perpendicular to the two parallel forward motion tracks 61 of the undercarriage. This arrangement will result in the instrument, such as an alidade 22, being aligned with the tracks when the reflectors are rotated into alignment with the sensors and undercarriage 63. With this arrangement, two sensors are required to achieve alignment for any rotation over a 360 degree range because, in mounting the inverted rotary table 45, its associated motor, gears and encoder housing will extend to one side beyond the path of the photo sensor signals in some positions of the shaft, blocking alignment indication. With two sensors 180 degrees apart, at least one light beam from a sensor will have an unobstructed path to the reflectors. Since the tracks are intended to travel in one direction only, one method to assure that the forward motion of the tracks is not observed in reverse is to have a first sensor and reflector radially offset so that the second set will be independent and not reflect the sensor signal of the first set. The sensors are provided with a slit mask 67 that blocks light from the sensor 68, except for a narrow spot or slit, to preclude readings from light not issuing directly from the top central portion of the sensor. For track alignment, a light beam is sent out from the sensor 68, travels through the slit mask 67 through the transparent rings 39 and 81 and is then reflected back from the photo-reflector 21 and returned to the sensor 68 when the instruments and tracks are in alignment.

The undercarriage 63, acting as framework for the drive tracks 61, has a centrally located aperture and mounts a connecting bracket for an optical plumb fiber-optic cable with an objective lens 77 for centering the unit directly over a starting point during initial set-up. A port is also provided in the lower portion of the shaft 6, providing a passage for the required lines and wiring necessary to interconnect the associated components. The stabilizing unit 14, once positioned on the work surface, does not rotate in any direction. As there is relative motion between the shaft 6, undercarriage 63, and the stabilizing unit, a slip ring 66 can be provided between the two for the electrical wiring. The wiring can be conducted between the platforms through ports in platform 4, such as port 46. The slip ring between the relative moving parts, for example, can be the Model MXT "thru-shaft configuration" manufactured by Meridian Laboratory of Middleton, Wis. The undercarriage 63 and drive tracks 61 are equipped with left and right microstepping motors and incremental shaft encoders 91 so as to propel the unit forward a required distance and azimuth without meandering in a feed-forward feed-back method, signalling the controller 36 of the movements made. The upper surface of the undercarriage 63 has a circular level bubble vial 92 for viewing while leveling the unit during initial set-up.

A minimum of three support legs 5 are affixed to the underside of the lower platform 4. These support legs are adjustable in height by thumb wheels 57 turning leveling screws 56, with a lower portion of the leg 59 being of smaller radius than the upper so as to allow telescopic adjustment. Rubber or neoprene isolation mounts 58 are incorporated at the top of the support legs 5 to aid in relieving any vibration introduced by rough work surfaces. These support legs are terminated with a ball type omnidirectional caster 55. Leveling of the unit and theodolite is accomplished by using the leveling screws 56 in the block 60 of support legs 5. The level position is determined by viewing the circular level vial 92 affixed to the undercarriage 63.

Each leg is equipped with a lifting and braking means 54. The type used is optional, but the one shown is a hydraulic cylinder with a stroke of approximately 1½" to 2½". The hydraulic cylinder is affixed to the lower portion 59 of the leg 5 and oriented in a vertical position in such a manner that, when engaged, the stroke of the hydraulic cylinder will lift the entire unit above the work surface approximately ½ to 1". Hydraulic fluid is supplied by a hydraulic power unit 42, arbitrarily located on the lower-platform 4. The lifting cylinders 54 are used in the "lift and turn process" to change the direction the robot travels in. The unit's lifting cylinder extension 53 extends downwardly to bring the drive tracks above the work surface. To prevent inaccurate angle and distance travel, the tracks are only used to propel the robot in a straight line. All turns are made by this "lift and turn process" to lift the tracks off the support surface so that the computer and positioning table can orient the track into the direction the robot is to travel in a frictionless unimpeded manner. If desired, a circle can be marked on the work surface by a 360 degree rotation of the undercarriage while the tracks are raised above the work surface. The rotary positioning table 45, rotates the undercarriage 63 and the drive tracks 61 under control of the computer to execute the required angle change. The lifting cylinders are then disengaged, lowering the drive tracks to the work surface in proper orientation for proceeding to the next point or location. The left and right track drive motors 91 are engaged by time delay after angle completion and the unit is propelled forward toward the next point. Meandering or veering from the straight path is restricted by the shaft encoder feed forward-feed back method. The travel distance required is measured by the stepping motor and the same incremental shaft encoder feed back 91. With the emitting system energized and under computer control, the desired emissions are made. For construction lay-out, for example, permanent, clear reference lines with sharp intersections are accurately and clearly provided. After initial set-up, and while in the running mode, the three support legs of the stabilizing unit perform as outriggers and stabilizers for the unit.

Each leg 5 is also provided with edge detector switches 51 having leg extensions 52. Each leg extension 52 has a limit switch of the vertically oriented spring-loaded type capable of detecting a drop of over 1". When the unit extension 52 is not contacted by a support surface, the spring extends interrupting the electrical circuit. When a surface is encountered, the spring is compressed to complete the electrical circuit. The edge detector prevents the robot from running off of an edge. The limit switches 51 may have a ball contact end so as to roll on the surface.

To assure tread contact and pressure sufficient for positive movement of the robot over the work surface when the treads move, pressure sensors 72 are provided on the track support means. The pressure sensors are used during the initial set-up to prevent movement until the appropriate pressure is exerted between the work surface and the treads. During initial leveling, if the unit is too low or too high above the work surface, the pressure sensor switch results in an incomplete circuit. This open circuit prevents any movement that does not raise the tracks off of the work surface an acceptable amount for free movement reorientation, or lower the track enough for positive traction. The leveling screws 56 of the support legs 5 must be turned to raised or lowered the legs so as to create enough pressure on the pressure sensor to cause the switch spring to compress the desired amount to complete the circuit. The circuit includes a light or display on the panel 25 indicating when the drive tracks will or will not be in acceptable pressure contact with the work surface. The track pressure sensor switches 72 may be provided with a hinge and hinged or folded away after the initial set-up is made. When folded away, the circuit will always be complete.

The lower outer perimeter of the stabilizing unit is provided with a contact pressure-sensitive switching means. The switching means shown is a pneumatic tube 75 extending around the stabilizing unit. On contacting a surface, the air within the tube is compressed activating a switching means that interrupts power to the track motors.

The underside of the undercarriage is equipped with a centrally mounted rail or bar 9 for attachment of emission means, such as an air supply or a light source or an ink jet or drop on command liquid supply. The marking system shown consists of a fixed, centrally mounted emitter or jet 95, and two emitters 96 on either side of the central emitter 95. They can each selectively provide coverage, such as a short line in the direction of travel or a short line at right angles to the forward motion of the unit. The emitters can, for example with a fluid, be provided with replaceable threaded nozzles. The nozzles can have different shape apertures such as circular, rectangular, T-shaped, X-shaped, etc. One example of ink jets that can be used is the TRIDENT® ULTRAJET™ large ink supply system by TRIDENT, Inc. of Brookfield, Conn.

The emission may be made while the unit is at a fixed location, with an emitter capable of producing a dot or short line or other character, or a line may be drawn while the unit is moving. The mounting rail or bar 9 of the emitting system can be hinged 15 on one side and clamped 16 on the other, allowing it to be swung aside during initial set-up or a final check that requires use of the optical plumb lens 77. The emitting system wiring and feed lines are of the flex type. A small wattage flashlight type bulb 78 can be provided near the lower end of the fiber-optic cable mounting with a push button actuator located on the upper platform to illuminate the optical plumb in low ambient light levels.

Control points and curved lines can be made by the same procedure used for transit and tape curved line generation, i.e. deflection angles and chord distances are plotted to the desired points. The curve is constructed with the number of points plotted determined by the accuracy required. These points or lines are programmed into or by the computer.

As indicated the emitters can dispense light, gas, liquid, waves, or a powder. The light may be in the form of a laser beam used to mark, burn, cut, or chemically expose and react. The gas may be in the form of air or an inert gas, at low or high pressure used to deform or move or cut, or a chemically unstable gas used to burn or chemically react. The liquid may be in the form of a coloring material, an oil, a sealer, an etcher, or a penetrator used to decorate, coat, mask, lubricate, mark, design, record or chemically react. The waves could be of various frequencies used for treating or reacting. The powder could be a coloring treatment or absorber material used for marking, coating, decorating, drying, treating, designing or chemically reacting dispensed by gravity or gas propulsion. While the primary use of the instant robot is for lay-out of construction sites, as indicated above, it can be used for many other purposes. It can lay out a design for photographic duplication or reduction such as for publications or electric circuitry manufacture; it can lay out an athletic field or court with boundary lines and mascot images; it can coat or cut designs from various materials for etching; it can be used to cut materials to shape for covering or pattern making; etc.

While this invention is to be operated on a flat horizontal surface, in many cases the flat surface will not be truly level. It is common to have a 1° or 2° slope for drains, a 5° slope to the next level, slopes to match new construction to existing surfaces, etc., and many other variables often exist for various reasons that preclude a flat surface. In order to achieve an accurate horizontal distance, within plan or blueprint tolerance, and to avoid accumulated errors, the track motor encoders measure the slope of the surface. The slope measurement is reduced to its horizontal equivalent and corrections made. The digital inclinometer 44 is suited to accomplish this correction. The inclinometer can be mounted within the unit so that upon initial set-up and leveling of the unit, the inclinometer may be indexed. It is shown being mounted on the undercarriage 63, parallel to the tracks 61, as, in this position, it will indicate the slope of the surface the tracks of the robot are moving on. Angular variations from horizontal, the initial level setting, are used throughout the courses traversed to compute corrections for slope measurements to indicate the actual horizontal distance traversed. The inclinometer can be of the T2 Tiltsensor Incremental Inclinometer type manufactured by U S Digital Corporation of Vancouver, Wash.

Wiring required for devices located at track level, may be bussed through the central portion of the hollow shaft 6 or between platforms using ports 46. The controlling program can include instructions to reverse direction from clockwise to counterclockwise rotation, or vice versa, upon reaching a determined threshold of accumulated degrees of rotation to avoid excessive twisting of wiring, tubes, etc. Many available rotary tables feature known homing sensors that would lend themselves to this application. Remaining devices outside the running system may be manually controlled or operated by a single circuit and activated by switches, buttons and/or indicator lights on the panel 25, i.e. unit on/off, track contact to surface, alidade track alignment sensors, optical plumb illumination, low battery indicator, fluid level low, etc. Retrievable transport and maneuvering handles 12 should be provided on the stabilizing unit for manual transport. Although the lines of travel must be cleared of large obstacles, dust and small debris may be cleared by providing a pneumatic or broom type sweeper attached to the front lower edge of the undercarriage. A compressed air cylinder can be provided with the outlet 76 positioned so as to blow away any remaining dust from below the emitter for better ink adherence to the work surface.

OPERATION

The four primary methods of initial set-up of interest for the present robot are here referred to as the work area fixed-point method, the remote fixed-point method, the self-reference method, and the existing lay-out method. For work, the most frequently encountered situations are (1) where a specific confined area requires a specific construction and arrangement that conforms to that specific confined area, and two or more known points and angles are the reference from which all other construction and locations are or can be taken with at least one of the points within the work area; (2) where two or more points and angles are known, that may be remote from the work area, and the construction and arrangement must be made with respect to those points and angles; (3) where the major concern is the construction and arrangement of items with respect to one another, the specific starting point location not being a major or critical concern; and (4) where a layout or arrangement is in existence and it is to be duplicated.

(1) The most widely encountered situation is where at least one point on the work surface is known and a second point is known within the work area or the angle from the first point to a second point is known. From these, all other angles, dimensions or spacings are taken. From these two references, directions and points within or outside the work area are known or can be calculated. From this initial known point and reference azimuth of the drive tracks, the on-board computing unit will calculate azimuth and distance to a desired coordinate pair for the robot's first travel.

(2) A second, more automated and costly method of initial set-up is where no known points appear on the work surface, such as multi-story buildings in which control lines are lost or in question, but distant points are known. This method adds to the standard transit or theodolite an electronic distance meter. With the two known points, the unit may be placed anywhere on the work surface within "sight" of the known points. The reference points are equipped with reflective prisms at a known elevation above the points. The robot is leveled and pointed in the direction of the reference points. The user engages the electronic distance meter measuring system, to determine the relative distance to the known points. Once the measurements are determined, the user or instrument computer will compute its own position by distance-distance and vertical angle intersection. After the unit's starting position and reference azimuth are determined, the navigating routine follows the computer program. The unit may be moved from one floor to the next and set randomly within "sight" of the known points and the procedure repeated using the data for that floor.

(3) When a reference azimuth is not required and only an approximate initial starting point (direction) is needed, as for example in the graphic arts where a self-reference is the only requirement, a simple gun sight arrangement is sufficient. The two elements of the gun sight may be affixed directly to the tribrach in alignment with the forward motion tracks when at the "home" position of the rotary table. The starting point is estimated and the computer program allowed to start at that point.

(4) If a known or finished arrangement or layout is available, the computer can collect data by use of a joystick. The robot is moved using the joystick, a starting point is determined, and the distances, directions and coordinates for the other points are recorded for future duplication. The robot is programmed with the recorded information and the program used, after establishing a corresponding starting point, to duplicate the arrangement or layout. As an alternative, the user of the robot can move the robot over the various points of interest using the on-board optical system and computer to plot the coordinates.

With all of these navigational systems, all pertinent data, coordinates, or angle-distance are loaded by point number as supplied by the engineer, designer or field personnel, and entered via an RS 232 port, a floppy disk or keyboard into the on-board computer. The emission system instructions are entered, i.e. for the emitters to be used, the on/off place and duration, emission while traveling or stationary, etc. If different colors are to be used, this information is also loaded into the computer.

The leveling screws are extended to raise the drive tracks above the surface. Supported on its omni-directional casters, the unit is positioned over the starting point and the unit is brought into level, by viewing the circular vial and adjusting the leveling screws of the legs. The inclinometer 44 is set for this horizontal position. The bar or rail 9 mounting for the marking system is unclamped and swung aside, permitting use of the optical plumb lens 77 and its fiber-optic system. The unit is then maneuvered into the starting position and brought into its final level for best maintaining track/work surface contact by slight adjustment of the leveling screws. This height is sensed by the pressure sensors 72 affixed to the undercarriage 63 and can be indicated on the panel 25. Final centering is checked using the optical plumb lens 77. The emission system is then brought back into proper position and clamped. This arrangement puts the central emitter directly over the first point of interest and the most likely area to be marked or worked. This location is entered as the beginning coordinates for the computer program, if these were not included in the original data input. A reference azimuth is then sighted using the instrument's alidade using the standard clamp and tangent screw to sight in the known second point or angle. The reference azimuth direction or 0°, 00', 00" is set using the instrument's horizontal circle/vernier. The instrument's upper motion is released and the alidade moved in rotation until approximate coincidence with the photo-electric sensor of the positioning table, as indicated by a brief flash of the coincidence indicator light as the sensor is passed. Using the instrument's upper motion clamp and tangent screw, the alidade is brought into final coincidence with the table's sensor and thereby coincidence with the current orientation of the forward motion of the drive tracks 61. This azimuth or angle is recorded and the azimuth entered, as the unit's reference azimuth. From this beginning point and angle, the unit may proceed to any location point or series of points under control of the computer program by inversing from one coordinate pair to another with the emitters or marking system on or off between point numbers, as needed.

The emitters 95, 96 can produce continuous or intermittent lines on the work surface corresponding to the direction of forward motion of the unit. The left and right emitters can provide short lines on the work surface perpendicular to the central line so as to designate incremental references along the path chosen. If, for example, a control line is to be laid out for the construction of a wall for a corridor with multiple entrance ways, the central marking device could produce a continuous line locating the center line or one face of the corridor. The side emitters at programmed locations, produce a short line or dot on either side of the corridor line so as to form, when joined, a line at 90° to the central continuous wall line to designate, for example, a doorway location. Alternatively, an emitter producing an elongated line perpendicular to the center line can be used or a shiftable emitter may be used. One side emitter may be programmed to designate the ends of window openings. As an alternative, each of the emitters 95,96 can be provided with a different color marking material source. With this arrangement, different functions or structure locations can be marked with their own individual color. Any number of color emitters can be provided on the bar or rail 9.

While erroneous data entry, mechanical wear or failure of parts will occur over time, and vary with working conditions, checks can be made by the user. This may be accomplished by entering, as a last set of coordinates, the beginning coordinates position. When the device arrives at this last location, the operator may observe and measure any variation. Additionally, the theodolite can be turned to coincidence with the track orientation, confirmed through the photo-sensor, and the last azimuth recorded. The theodolite alidade is then oriented toward the initial, or other known azimuth, to confirm the point of origin. Evaluation is then made to determine if the point of termination is within required tolerances. These methods confirm both the consistency of the measurements and the accuracy of data entry. Also, the standard method of checking distance accuracy, as used by the surveyor, may be employed. A known distance is laid-out, either by a standardized measuring tape or electronic distance meter, and points established. The device is then run between these points for an accuracy check. Using these procedures, the accuracy of the program can be checked by running the robot through the program with the emitters turned off. This permits the program to be checked without placing erroneous markings on the work surface.

It is believed that the construction, operation and advantages of this invention will be apparent to those skilled in the art. It is to be understood that the present disclosure is illustrative only and that changes, variations, substitutions, modifications and equivalents will be readily apparent to one skilled in the art and that such may be made without departing from the spirit of the invention as defined by the following claims.

I claim:

1. A self propelled mobile robot equipped for treating a surface comprising:

a propulsion system for propelling said mobile robot;

a navigation means for use in determining the path of travel of said mobile robot;

an on-board emitting means for treating said surface;

a computer program means for use with said navigation means system and the position of said robot and for controlling and operating emissions from said emitting means.

2. A self propelled mobile robot equipped for treating a surface as described in claim 1 wherein:

said emitting means include plural emitting outlets;

said emitting means include plural different color supplies for said plural emitting outlets.

3. A self propelled mobile robot equipped for treating a surface as described in claim 1 wherein:

said navigation means includes a lifting means for raising said robot from said surface while said propulsion system is shifted from one direction of travel into another direction of travel to preclude inadvertent slippage and assure sharp, accurate direction changes.

4. A self propelled mobile robot equipped for treating a surface as described in claim 1 wherein:

adjustable legs support said robot on said surface to provide a leveling means and to stabilize said robot during movement.

5. A self propelled mobile robot equipped for treating a surface as described in claim 1 wherein:

contact switch means are mounted on said robot;

said contact switch means prevent movement of said robot if obstacles are encountered or said robot attempts to travel over an edge;

said contact switch means includes spring-loaded surface probes held in compression by contact with said surface.

6. A self propelled mobile robot equipped for treating a surface as described in claim 4 wherein:

a level indicating means is provided on said robot;

said adjustable legs permit said robot to be adjusted with respect to said surface until said level indicating means indicate said robot to be level with respect to the Earth's center of attraction.

7. A self propelled mobile robot equipped for treating a surface as described in claim 4 wherein:

said propulsion means includes a surface engaging means and a surface engaging means support;

a pressure sensor means on said surface engaging means support for indicating the pressure between said surface and said surface engaging means.

8. A self propelled mobile robot equipped for treating a surface as described in claim 1 wherein:

said robot propulsion system is rotatable relative to said robot navigation means;

said navigation means includes an alinement instrument means;

a sensor means is provided on said propulsion system to indicate when said propulsion system and said alinement instrument means of said navigation means are rotated into alinement.

9. A self propelled mobile robot equipped for treating a surface as described in claim 1 wherein:

said robot is provided with a computer;

said robot is provided with a keyboard and a floppy disk drive and a keyboard socket means for input to said computer program means that feeds data to said computer to control the path said robot is to travel in.

10. A self propelled mobile robot equipped for treating a surface as described in claim 1 wherein:

said navigation means includes a theodolite that is able to position said robot at a desired starting point by using known distant points as a reference.

11. A self propelled mobile robot equipped for treating a surface as described in claim 1 wherein:

said robot is provided with a computer;

an inclinometer is provided on said robot for indicating information on the slope of said surface said robot is traveling over;

a communication means is provided between said inclinometer and said computer so that said information on said slope of said surface is provided to said computer to convert the actual distance traveled by said robot to the horizontal distance traveled by said robot.

12. A self propelled mobile robot equipped for treating a surface as described in claim 11 wherein:

said emitting means include plural emitting outlets;

said emitting means include plural different color ink supplies for said plural emitting outlets;

said navigation means includes a lifting means for raising said robot above said surface while said propulsion system is shifted from one direction of travel into another direction of travel to preclude slippage and provide sharp angular turns;

contact switches are provided on said robot to prevent movement of said robot if obstacles are encountered or said robot attempts to travel over an edge;

said robot propulsion system is rotatable with respect to said robot navigation means;

an alinement instrument means is included as a part of said navigation means;

a sensor means is provided on said propulsion system to indicate when said propulsion system and said alinement instrument means of said navigation means are rotated into alinement;

a level indicating means is provided for indicating when said robot is level with respect to the Earth's center of attraction;

adjustable legs are provided for supporting said robot;

said adjustable legs permit said robot to be adjusted with respect to said surface until said level indicating means indicates said robot to be level with the Earth's center of attraction.

13. A self propelled mobile robot equipped for treating a surface as described in claim 1 wherein:

an optical plumb is provided with said navigation means for locating said robot over a starting point for the path said robot is to travel.

14. The process of performing work on a surface using a robot by:

providing a self-propelled robot with a propulsion system for moving said robot and a navigation means for controlling said propulsion system and an emitting means for performing work on said surface;

providing said navigation means with a computer and a computer program;

feeding lay-out information into said computer program;

using said computer program to command said computer to control said robot propulsion system to move and position said robot and to control emissions from said emitting means to perform said work on said surface.

15. The process of performing work on a surface using a robot as contained in claim 14 further including:

providing said robot with an inclinometer;

using said inclinometer to determine the slope of said surface said robot is traveling over;

communicating information on said slope of said surface determined by said inclinometer to said computer;

using said computer program to correct said robot's movements over said surface for errors caused by said slope of said surface so that said work is performed only with respect to the horizontal travel of said robot.

16. The process of performing work on a surface using a robot as contained in claim 14 further including:

providing said robot with a theodolite;

positioning said robot at a starting point for performing said work by using said theodolite to determine said starting point from known distant reference points.

17. The process of performing work on a surface using a robot as contained in claim 14 further including:

providing said robot with adjustable legs and a level indicating means;

providing said emitting means with a mounting means;

using said level indicating means and said adjustable legs to position said robot's emitting means mounting means level with the earth's center of attraction.

18. The process of performing work on a surface using a robot as contained in claim 14 further including:

providing a lifting means for raising and lowering said robot;

changing said propulsion system's direction of travel by using said lifting means to raise said robot's propulsion system off of said surface while changing said propulsion system's direction of travel to avoid slippage and provide for sharp turns.

19. The process of performing work on a surface using a robot as contained in claim 18 further including:

providing said robot with an orientation sensor means for indicating the position of said navigation means with respect to said propulsion system;

using said orientation sensor means to aline said navigation means with said propulsion system;

communicating said alinement of said navigation means and said propulsion means to said computer;

lowering said robot to said surface with said lifting means before using said propulsion system to propel said robot.

20. The process of navigating a self-propelled robot over a surface by:

providing a self-propelled robot having a navigation means and a propulsion system;

providing said robot with means for raising said robot above said surface and lowering said robot onto said surface;

changing the direction said robot is traveling in by raising said robot above said surface and orienting said robot propulsion means from one direction of travel into a new direction of travel while said robot is raised above said surface;

lowering said robot onto said surface before propelling said robot in said new direction of travel.

21. The process of navigating a self-propelled robot over a surface as in claim 20 by further:

providing a rotary positioning table for orienting said propulsion system;

rotating said rotary positioning table to change said direction of travel of said robot propulsion system from said one direction of travel into said new direction of travel.

22. The process of navigating a self-propelled robot over a surface as in claim 20 by further:

moving said robot from one point to another using feed forward commands from said navigation means to said propulsion system, and encoder feed back commands from said propulsion system to said navigation system to avoid unwanted meandering from a direct path and to check the distance traveled.

23. The process of navigating a self-propelled robot over a surface as in claim 20 by further:

moving said robot from one point of interest to another;

recording the coordinates of each said point of interest in said computer;

retracing the movement of said robot between said recorded points of interest using said recorded coordinates.

24. The process of navigating a self-propelled robot over a surface as in claim 20 by further:

including in said propulsion system a surface engaging means and a surface engaging means support;

providing said surface engaging means support with a pressure sensor means;

adjusting the pressure between said surface and said surface engaging means using said pressure sensor means to indicate said pressure.

* * * * *